United States Patent [19]

Meunier

[11] Patent Number: 4,535,202

[45] Date of Patent: Aug. 13, 1985

[54] LOOP-CIRCUIT FOR TELEPHONE LINE

[75] Inventor: Bernard Meunier, Le Chesnay, France

[73] Assignee: Compagnie Generale de Constructions Telephoniques, Paris, France

[21] Appl. No.: 509,789

[22] Filed: Jun. 30, 1983

[30] Foreign Application Priority Data

Jul. 7, 1982 [FR] France .................. 82 11898

[51] Int. Cl.³ .................. H03K 17/00; H04M 1/31
[52] U.S. Cl. .................. 179/18 FA; 179/16 AA; 307/311
[58] Field of Search .......... 179/16 AA, 16 F, 16 EA, 179/18 FA; 307/253, 254, 311, 570, 571, 575, 580

[56] References Cited

U.S. PATENT DOCUMENTS

| | | | |
|---|---|---|---|
| 3,801,837 | 4/1974 | Pease et al. | 307/311 |
| 3,987,319 | 10/1976 | Nirschl | 307/311 |
| 4,037,120 | 7/1977 | Colardelle et al. | 307/311 |
| 4,282,604 | 8/1981 | Jefferson | 455/602 |
| 4,476,351 | 10/1984 | Beegle et al. | 179/77 |

FOREIGN PATENT DOCUMENTS 2145074 2/1973 France .
2251975 6/1975 France .

OTHER PUBLICATIONS

Millman, Jacob, *Microelectronics*, 1979, McGraw-Hill Book Co., pp. 689–691.

*Primary Examiner*—Gene Z. Rubinson
*Assistant Examiner*—Elio Di Vito
*Attorney, Agent, or Firm*—Sherman Levy

[57] ABSTRACT

A loop-circuit for a telephone line is provided that includes a transistor having a first electrode directly connected to one of the wires of the line, a second electrode connected to the other of the wires of the line by means of a resistor, a gate electrode thereof being connected via a resistor to one of the wires of the line, and by means of a capacitor to the other wire of the line, wherein a switch is arranged to cut-off the transistor and another switch is arranged or provided to disconnect one of the plates of the capacitor from the rest of the circuit.

4 Claims, 1 Drawing Figure

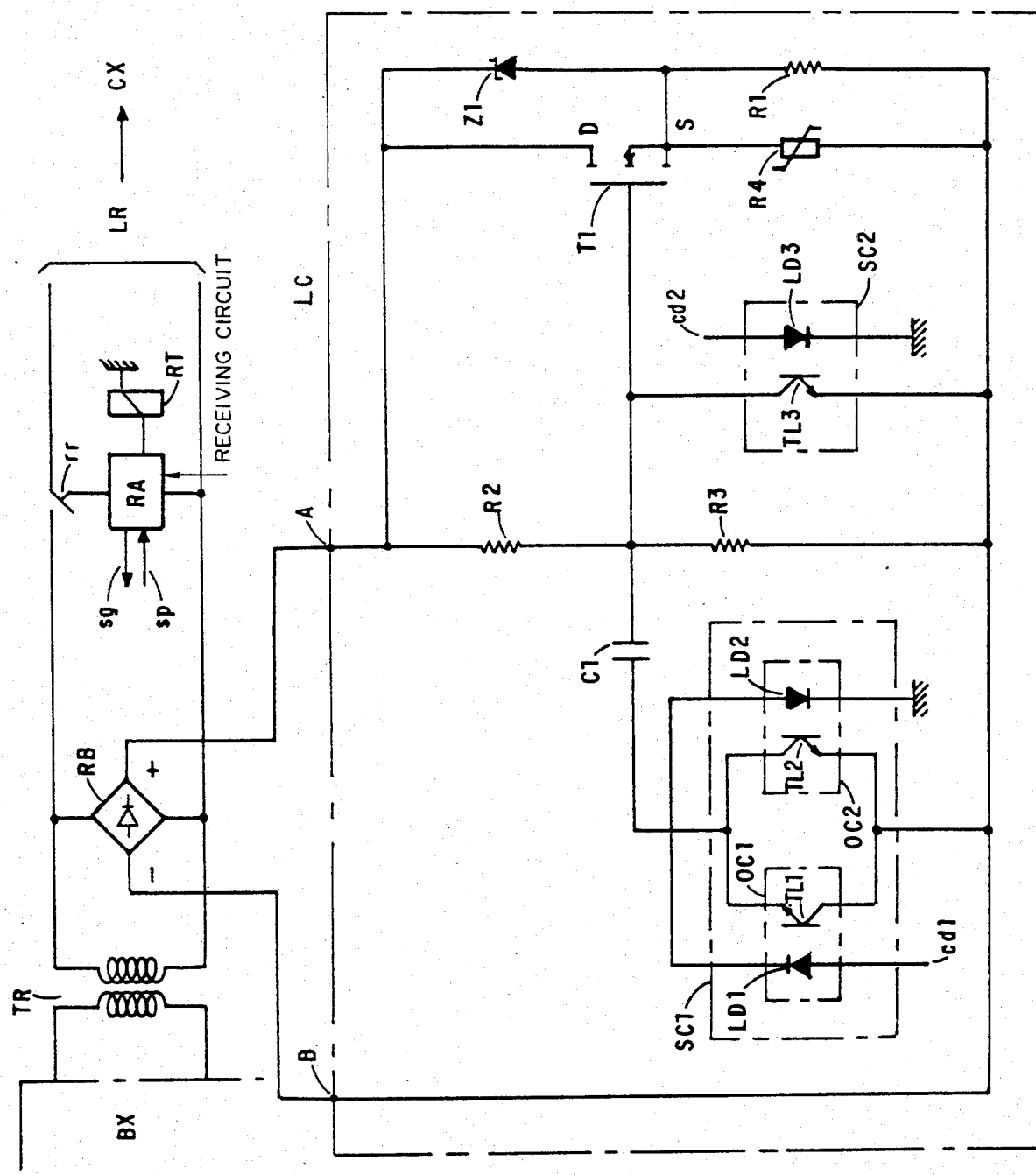

LOOP-CIRCUIT FOR TELEPHONE LINE

The object of the present invention is a loop-circuit for a telephone line, more particularly, a termination circuit for a trunk line in a private telephone installation.

In a private telephone installation, upon a call to the public network, whether this call be incoming or outgoing, it is necessary to close the used trunk line, i.e. to establish continuity for the d.c. current between the two wires of the line. Further, particularly in the case of a outgoing call, it must be possible to open the loop at will, for sending dialling impulses.

A known solution consists in providing a loop-closing circuit of the line connected in parallel with this one, the communication path with the extension telephone set being disconnected by a transformer separating in d.c. current the private installation from the public network.

This parallel loop-circuit must not weaken the speech currents. It must thus have the characteristics of an inductance. In order to realize such a circuit while avoiding the use of windings which are of high-cost and large overall dimensions, a known process consists in using a gyrator dipole. Such a gyrator dipole is particularly described in the French Pat. No. 71 25013 filed on July 8, 1971. This gyrator dipole comprises a transistor whose collector is directly connected to a first terminal of the gyrator, whose transmitter is connected to the other terminal of the gyrator via a resistor, and whose gate electrode is connected to the first terminal via a resistor and to the other terminal of the gyrator via a capacitor. At vocal frequencies, by appropriate dimensioning, this gyrator is equivalent to an inductance.

The French Pat. No. 73 40850 filed on Nov. 16, 1973, particularly describes a loop-closing circuit using a similar gyrator in which the voltage across the capacitor is held substantially constant. Therefore, the transistor operating in class A only conducts a d.c. current of constant value. Such a solution is not always applicable, particularly when the current delivered by the public exchange is already the subject of a regulation.

The invention concerns a gyrator loop circuit in which the loop presents to the vocal frequency currents an almost constant high impedance. In this case the load of the gyrator's capacitor depends on the line voltage. Now, when the loop is open, the line voltage varies. It is therefore important to preserve the capacitor from such variations.

So, the present invention also concerns a circuit of the type previously defined in which the voltage across the capacitor is preserved from the line voltage fluctuations when the loop is open.

The loop circuit of the invention is characterized in that a switch is arranged to cut-off at will the transistor and that another switch is arranged to disconnect one of the capacitor plates from the rest of the circuit.

Another characteristic of the loop-circuit of the invention lies in the fact that the gyrator transistor is realized in accordance with the V-MOS technology.

Still another characteristic of the loop-circuit of the invention lies in the fact that the first switch is an optocoupler comprising, particularly, a phototransistor whose transmitter-collector circuit is connected between the gate electrode of the transistor and the wire of the line which is connected to an electrode of the transistor via a resistor.

A further characteristic of the loop-circuit of the invention lies in the fact that the second switch is a two-way switch realized by means of two optocouplers whose transistors are series connected -oppositely- poled with the capacitor.

Different other features of the invention will become more apparent and the invention itself will be best understood from the following description which is given by way of non-limiting example with reference to the accompanying drawing which represents an example of embodiment of a loop circuit designed in accordance with this invention.

The loop circuit LC of the accompanying drawing is connected in parallel on the wires of a trunk line LR connecting a private telephone exchange BX to a public telephone exchange CX via a discoupling transformer TR. In the rest condition, the line LR is connected to a call receiving circuit RA by the break contact rt of a d.c. relay RT. Upon reception of the a.c. call current, the circuit RA produces a signal sg. When the call is answered, the set of the answering person is connected by the private exchange BX to the transormer TR, and a control signal sp, applied to the call receiving circuit RA, energizes the relay RT.

The contact rt operates and connects the trunk line LR to the transformer TR in order to establish the speech path. The trunk line LR is closed on the loop-circuit LC.

Upon an outgoing call, the relay RT is energized the same way.

The loop circuit LC is connected to the trunk line LR via a rectifier bridge RB imposing to the current in the loop-circuit LC always the same direction whichever be the voltage polarity of the trunk line LR. Thus the positive and negative outputs of the brideg RB are connected respectively to the inputs A and B of the loop circuit LC.

This loop circuit, particularly, comprises a gyrator dipole consisting of a transistor T1 of the V-MOS type, of a capacitor C1 and of resistors R1 to R3.

The drain electrode of transistor T1 is connected to the input A of the loop-circuit LC. The source electrode of this transistor is connected to the input B of the loop-circuit LC via resistor R1. The gate electrode of transistor T1 is connected to the common point to resistors R2 and R3 connected in series between the inputs A and B.

A first plate of the capacitor C1 is connected to the gate electrode of transistor T1, the other plate of this capacitor being connected to the source electrode of this transistor via a two-way switch SC1.

The switch comprises a first optocoupler OC1 consisting of a light-emitting diode LD1 and of a phototransistor TL1, and a second optocoupler OC2 consisting of a light-emitting diode LD2 and a phototransistor TL2.

The transmitter of phototransistor TL1 and the collector of phototransistor TL2 are connected to the second plate of capacitor C1. The collector of phototransistor TL1 and the transmitter of phototransistor TL2 are connected to the input B of the loop-circuit LC.

The anode of light-emitting diode LD1 is connected to a source of control signals cd1 (not shown). The cathode of this diode is connected to the anode of diode LD2. The cathode of the latter is connected to the reference potential, for example the ground potential.

The loop-circuit LC also comprises a switch SC2 connected between the gate electrode of transistor T1 and the input B of the circuit. This switch SC2 is, according to the selected example, an optocoupler comprising a phototransistor TL3 whose transmitter is connected to the input B of the loop-circuit LC and whose collector is connected to the gate electrode of transistor T1, and a light-emitting diode LD3 whose cathode is earthed and whose anode receives the control signals cd2.

The loop circuit LC further comprises a regulating thermistor R4 connected in parallel with resistor R1, and a Zener effect protective diode Z1 whose anode is connected to the source electrode of transistor T1 and whose cathode is connected to the input A.

There will now be described the operation of the loop-circuit LC.

When the line LR has to be closed, a level 0 control signal cd2 is applied to the anode of diode LD3 that is cut-off. The switch SC2 opens and transistor T1 conducts. Simultaneously, the switch SC1 is closed by the control signal cd1 at level 1. Due to the presence of two oppositely-poled transistors, capacitor C1 is included in the circuit for both current directions.

In summary the control signal cd1 at level 1 closes the switch SC1 and, according to the selected example described above, the optocoupler OC1 consists of the light-emitting diode LD1 and the phototransistor TL1, and the optocoupler IC2 consists of the phototransistor TL2. The circuit for either selection of directions of currents passing through diodes LD1, LD2 due to the responses of the respective optocouplers OC1, OC2.

The gyrator dipole T1-C1-R1-R2 then operates normally: it ensures the looping of line LR for the d.c. current. Further, the speech signals transimitted on that line are not weakened by the dipole which is equivalent in a.c. current to a high value inductance.

Upon an outgoing call, the loop-circuit enables the transmission of impulses to be done under the form of openings of the loop.

Each opening of the loop is obtained by sending a level 1 control signal cd2. The diode LD3 becomes conductive and the switch SC2 closes and connects the gate electrode of transistor T1 to the input B of the loop-circuit LC. Transistor T1 cuts-off.

Simultaneously there is controlled the opening of the switch SC1 by sending a level 0 control signal cd1. The second plate of capcitor C1 is then isolated from the rest of the circuit. This way, capacitor C1 keeps its load during the impulse. After the impulse, it is connected again to transistor T1 and the loop is restored with no disturbance.

The loop-circuit then does enable the telephone line LR to be closed without weakening the speech currents. It also enables the transmission of impulses to be done (digit impulses, for example) under the form of openings of the loop.

It is to be understood that the foregoing description has been given as an unrestrictive example and that numerous other embodiments may be considered without departing from the scope of the invention.

I claim:

1. A loop-circuit for a telephone line comprising a gyrator circuit consisting of a transistor of which a first electrode is directly connected to one of the wires of the line, of which a second electrode is connected to the other of the wires of the line via a resistor, of which the gate electrode is connected via a resistor to said one of the wires of the line, and via a capacitor to said other wire of the line, characterized in that a switch (SC2) directly connected between the gate electrode of said transistor (T1) and said other wire of the line is arranged responsive to a signal cutting off said transistor (T1), and that another switch (SC1) directly connected between said capacitor (C1) and said other wire of the line is arranged responsive to a signal disconnecting one of the plates of said capacitor (C1) from the rest of the circuit.

2. A loop-circuit as defined in claim 1, characterized in that said transistor (T1) is realized according to the V-MOS technology 3. A loop-circuit as defined in claim 1, characterized in that said switch (SC2) is an optocoupler comprising, particularly, a phototransistor (TL3) whose emitter-collector circuit is directly connected between the gate electrode of said transistor (T1) and said other wire of the line (LR).

4. A loop-circuit as defined in claim 1, characterized in that the other switch (SC1) is a two-way switch realized by means of two optocouplers (OC1, OC2) of which the phototransistors (TL1, TL2) are series - connected - oppositely - poled with the capacitor (C1).

* * * * *